(12) United States Patent
Torazawa et al.

(10) Patent No.: US 6,339,571 B1
(45) Date of Patent: Jan. 15, 2002

(54) STORAGE MEDIUM RECORDED WITH RECORDING/REPRODUCING CONDITIONS DEPENDING UPON RECORDING DENSITIES AND METHOD OF RECORDING AND REPRODUCING THEREFOR

(75) Inventors: Kenji Torazawa; Toshiaki Hioki, both of Gifu (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/026,521

(22) Filed: Feb. 20, 1998

(30) Foreign Application Priority Data

Feb. 21, 1997 (JP) .............................................. 9-038149

(51) Int. Cl.[7] .............................................. G11B 7/00
(52) U.S. Cl. ................ 369/53.2; 369/47.52; 369/47.54; 369/47.55; 369/53.27; 369/53.37
(58) Field of Search ........................ 369/94, 13, 47.43, 369/44.46, 47.54, 47.31, 53.2, 53.22, 53.37, 47.55, 47.39, 47.3, 47.27, 32, 47.52, 53.27

(56) References Cited

U.S. PATENT DOCUMENTS

| | | | | |
|---|---|---|---|---|
| 5,136,569 A | * | 8/1992 | Fennema et al. | 369/58 |
| 5,289,451 A | * | 2/1994 | Ashinuma et al. | 369/54 |
| 5,587,981 A | * | 12/1996 | Kamatani | 369/58 |
| 5,694,381 A | * | 12/1997 | Sako | 369/58 |
| 5,712,838 A | * | 1/1998 | Inazawa et al. | 369/58 |
| 5,732,088 A | * | 3/1998 | Sako | 371/2.1 |
| 5,793,779 A | * | 8/1998 | Yonemitsu et al. | 371/402 |
| 5,870,371 A | * | 2/1999 | Tsuchiya et al. | 369/94 |
| 5,978,322 A | * | 11/1999 | Sugimoto et al. | 369/58 |

\* cited by examiner

Primary Examiner—Thang V. Tran
(74) Attorney, Agent, or Firm—Armstrong, Westerman, Hattori, McLeland & Naughton, LLP (57) ABSTRACT

A table having a plurality of recording densities and a plurality of recording/reproducing conditions corresponding to the recording densities and each necessary for recording/reproducing a signal at a corresponding recording density is recorded in a TOC region of a magneto-optical disk. A recording/reproducing apparatus finds out a recording density at which it can record/reproduce data from the table and records or reproduces a signal at the recording density. The recording/reproducing conditions include the wavelength of a semiconductor laser, whether or not to employ the optical pulse magnetic field modulation recording method, the presence/absence of an optical super resolution pickup, whether or not to employ the optical pulse reproducing method, whether or not to employ the PRML method and the like. Therefore, if the recording/reproducing technology further advances, a signal may be recorded/reproduced to/from the magneto-optical disk at an optimum recording density without having to change the data format of the magneto-optical disk.

20 Claims, 9 Drawing Sheets

| PHRASE NO. | ←――――――――― 8 BYTES ―――――――――→ | | | | | | | |
|---|---|---|---|---|---|---|---|---|
| 1 | $a_1$ | $b_1$ | $c_1$ | $d_1$ | $e_1$ | $f_1$ | $g_1$ | $h_1$ |
| 2 | $a_2$ | $b_2$ | $c_2$ | $d_2$ | $e_2$ | $f_2$ | $g_2$ | $h_2$ |
| 3 | $a_3$ | $b_3$ | $c_3$ | $d_3$ | $e_3$ | $f_3$ | $g_3$ | $h_3$ |
| ⋮ | ⋮ | ⋮ | ⋮ | ⋮ | ⋮ | ⋮ | ⋮ | ⋮ |
| n | $a_n$ | $b_n$ | $c_n$ | $d_n$ | $e_n$ | $f_n$ | $g_n$ | $h_n$ |
| ⋮ | ⋮ | ⋮ | ⋮ | ⋮ | ⋮ | ⋮ | ⋮ | ⋮ |
| 254 | $a_{254}$ | $b_{254}$ | $c_{254}$ | $d_{254}$ | $e_{254}$ | $f_{254}$ | $g_{254}$ | $h_{254}$ |
| 255 | $a_{255}$ | $b_{255}$ | $c_{255}$ | $d_{255}$ | $e_{255}$ | $f_{255}$ | $g_{255}$ | $h_{255}$ |
| 256 | $a_{256}$ | $b_{256}$ | $c_{256}$ | $d_{256}$ | $e_{256}$ | $f_{256}$ | $g_{256}$ | $h_{256}$ |

TABLE OF CONTENTS

FIG.6

| PHRASE NO. | \|← | | | 8 BYTES | | | | →\| |
|---|---|---|---|---|---|---|---|---|
| n | a$_n$ | b$_n$ | c$_n$ | d$_n$ | e$_n$ | f$_n$ | g$_n$ | h$_n$ |
| n+1 | a$_{n+1}$ | b$_{n+1}$ | c$_{n+1}$ | d$_{n+1}$ | e$_{n+1}$ | f$_{n+1}$ | g$_{n+1}$ | h$_{n+1}$ |
| n+2 | a$_{n+2}$ | b$_{n+2}$ | c$_{n+2}$ | d$_{n+2}$ | e$_{n+2}$ | f$_{n+2}$ | g$_{n+2}$ | h$_{n+2}$ |
| n+3 | a$_{n+3}$ | b$_{n+3}$ | c$_{n+3}$ | d$_{n+3}$ | e$_{n+3}$ | f$_{n+3}$ | g$_{n+3}$ | h$_{n+3}$ |
| n+4 | a$_{n+4}$ | b$_{n+4}$ | c$_{n+4}$ | d$_{n+4}$ | e$_{n+4}$ | f$_{n+4}$ | g$_{n+4}$ | h$_{n+4}$ |
| n+5 | a$_{n+5}$ | b$_{n+5}$ | c$_{n+5}$ | d$_{n+5}$ | e$_{n+5}$ | f$_{n+5}$ | g$_{n+5}$ | h$_{n+5}$ |
| n+6 | a$_{n+6}$ | b$_{n+6}$ | c$_{n+6}$ | d$_{n+6}$ | e$_{n+6}$ | f$_{n+6}$ | g$_{n+6}$ | h$_{n+6}$ |
| n+7 | a$_{n+7}$ | b$_{n+7}$ | c$_{n+7}$ | d$_{n+7}$ | e$_{n+7}$ | f$_{n+7}$ | g$_{n+7}$ | h$_{n+7}$ |
| n+8 | a$_{n+8}$ | b$_{n+8}$ | c$_{n+8}$ | d$_{n+8}$ | e$_{n+8}$ | f$_{n+8}$ | g$_{n+8}$ | h$_{n+8}$ |
| n+9 | a$_{n+9}$ | b$_{n+9}$ | c$_{n+9}$ | d$_{n+9}$ | e$_{n+9}$ | f$_{n+9}$ | g$_{n+9}$ | h$_{n+9}$ |

FIG.7

| n+1 | a$_{n+1}$ | b$_{n+1}$ | c$_{n+1}$ | d$_{n+1}$ | e$_{n+1}$ | f$_{n+1}$ | g$_{n+1}$ | h$_{n+1}$ |
|---|---|---|---|---|---|---|---|---|
| | a$_1$ | b$_1$ | c$_1$ | d$_1$ | e$_1$ | f$_1$ | g$_1$ | h$_1$ |

STORAGE MEDIUM RECORDED WITH RECORDING/REPRODUCING CONDITIONS DEPENDING UPON RECORDING DENSITIES AND METHOD OF RECORDING AND REPRODUCING THEREFOR

BACKGROUND OF THE INVENTION

1. Field of the Invention

The present invention relates generally to recording mediums such as disk, tape and drum and to methods of recording and reproducing therefor, and more particularly, to a magneto-optical disk and a recording/reproducing method therefor.

2. Description of the Related Art

Various storage mediums such as compact disk, mini disk, digital video disk and video tape are provided today. The data formats and recording capacities of these storage mediums are specified by JIS (Japanese Industrial Standards) or the like. On the other hand, recent developments in various elements in the field of recording/reproducing and pickup technology have enabled a significant increase in the recording capacities.

It would be difficult to secure compatibility between recording/reproducing apparatuses for a recording medium if the specification of the recording medium is changed every time rapid progress in the technology enables a further increase in recording capacity. If we give up the compatibility, however, a reproducing apparatus fabricated according to a new specification may not be able to reproduce signals from a storage medium according to an old specification, which gives rise to inconvenience to a user. Meanwhile, in order to secure compatibility, the cost to produce a recording/reproducing apparatus increases.

SUMMARY OF THE INVENTION

It is therefore one object of the invention to provide a storage medium permitting recording at a high density almost without having to change the specification in the future and a recording/reproducing method therefor.

Another object of the invention is to provide a storage medium which makes easier improvement of a recording/reproducing apparatus in association with increase in the recording density, and a recording/reproducing method therefor.

A storage medium according to one aspect of the invention includes a recording area and correlation information. The correlation information is recorded in the recording area, and indicates the correlation between recording densities and recording/reproducing conditions each necessary for a recording/reproducing apparatus to record and/or reproduce a signal at a recording density. The correlation information preferably includes a table. The table has a plurality of recording densities and a plurality of recording/reproducing conditions each necessary for a recording/reproducing apparatus to record and/or reproduce a signal at a corresponding recording density. The storage medium preferably further includes a plurality of recording unit regions for recording prescribed data. The recording densities permit the prescribed data to be equally allocated to the plurality of recording unit regions. The recording region preferably includes a spirally formed track. The correlation information is recorded on an innermost and/or outermost part of the spiral track. The storage medium preferably further includes identification information recorded in the recording area to identify a recording density at which a signal has been recorded. Note that the recording/reproducing conditions are preferably pre-stored in a memory or the like in the recording/reproducing apparatus.

According to another aspect of the invention, a method of recording a signal in a storage medium including a recording area and correlation information recorded in the recording area and indicating correlation between recording densities and recording conditions necessary for a recording apparatus to record a signal at the recording densities includes the steps of loading the correlation information from the storage medium, determining a recording density based on the loaded correlation information, and setting a recording condition based on the determined recording density. The recording apparatus preferably has a plurality of first recording conditions which are necessary for recording a signal and can be selectively set. The correlation information includes a table having a plurality of recording densities and a plurality of second recording conditions corresponding to the plurality of recording densities and each necessary for the recording/reproducing apparatus to record a signal at a corresponding recording density. The determination step includes the steps of comparing the plurality of first recording conditions with the plurality of second recording conditions loaded in the table, selecting a second recording condition in coincidence with the first recording condition among the plurality of second recording conditions based on the result of the comparing step, and specifying a recording density corresponding to the second recording condition selected from the plurality of recording densities. Further preferably, the above method further includes the step of interrupting recording of a signal if none of the second recording conditions is in confidence with each of the first recording conditions based on the result of the comparison step. The determination step preferably includes the steps of comparing the plurality of first recording conditions with the plurality of second recording conditions in the loaded table, selecting a plurality of second recording conditions in coincidence with the first recording conditions from the plurality of second recording conditions, displaying a plurality of recording densities corresponding to the selected plurality of second recording conditions, and specifying one of the displayed plurality of recording densities in response to a specification by the user. The setting step preferably changes the frequency of a synchronizing clock signal used to record a signal in response to the determined recording density. The recording apparatus preferably further includes a frequency divider for generating a synchronizing clock signal. The changing step changes the dividing ratio of the frequency divider depending upon the determined recording density. The storage medium preferably further includes a plurality of recording unit regions for recording prescribed data. The recording densities permit the prescribed data to be equally allocated into the plurality of recording unit regions.

According to yet another aspect of the invention, a method of reproducing a signal from a storage medium including a recording area, correlation information recorded in the recording area and indicating correlation between recording densities and reproducing conditions necessary for a reproducing apparatus to reproduce a signal at the recording densities, and identification information recorded in the recording area for identifying a recording density at which a signal has been recorded includes the steps of loading the correlation information and identification information from the storage medium and setting the reproducing apparatus to a reproducing condition based on the loaded correlation information and identification information. The setting step preferably changes the frequency of a synchronizing clock signal used for reproducing a signal depending upon the recording density of the loaded identification information. The reproducing apparatus preferably further includes a frequency divider for generating a synchronizing clock signal. The changing step changes the dividing ratio of the frequency divider depending upon the recording density of the loaded identification information.

Since the storage medium includes the correlation information indicating correlation between recording densities and recording/reproducing conditions, a new type recording/ reproducing apparatus employing a new technique may record/reproduce a signal to/from the medium at an appropriate recording density, and an old type recording/ reproducing apparatus may record/reproduce a signal to/from the medium at a conventional recording density. Therefore, a storage medium capable of recording at a high density almost without changing the specification is provided. As a result, a recording/reproducing apparatus can be prevented from rapidly becoming out of date in association with changes in the specification, and can flexibly suit user's preference.

Since the recording densities employed permit prescribed data to be equally allocated into a plurality of recording unit regions, a circuit configuration for distributing the data may be simplified.

Furthermore, since the frequency of a synchronizing clock signal is changed depending upon the determined recording density, the recording density may be improved even if the speed of the storage medium relative to the pickup is fixed. In addition, according to the above-described method, the dividing ratio of the frequency divider is changed depending upon the determined recording density, and therefore the frequency of the synchronizing clock signal may be easily changed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A magneto-optical disk and a recording/reproducing method therefor according to an embodiment of the invention will be now described in detail by referring to the accompanying drawings. Note that the same or corresponding portions in these drawings are denoted by the same reference characters and the description will not be repeated.

Figure 1:
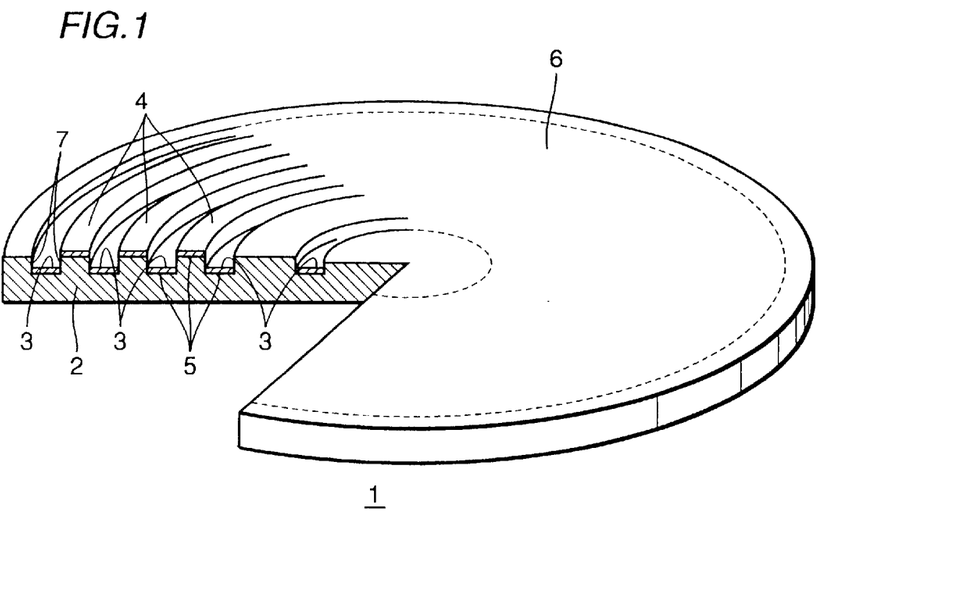
FIG. 1 is a partly cut away perspective view showing a magneto-optical disk according to an embodiment of the invention.

Referring to FIG. 1, a magneto-optical disk 1 has a circular transparent substrate 2 formed of polycarbonate resin. A spiral groove 3 is formed at one surface of transparent substrate 2. As a result, a spiral land 4 is formed between adjacent walls of groove 3. Groove 3 and land 4 form a track. A magneto-optical recording film 5 is formed on groove 3 and land 4. An area having the track therefore forms a recording area 6 in magneto-optical disk 1. A protection film (not shown) is formed on magneto-optical recording film 5.

Although a CAV (Constant Angular Velocity) type magneto-optical disk, which is rotated at a fixed angular velocity, will be described, the invention is not limited to this, and may be applied to a CLV (Constant Linear Velocity) type disk, which is rotated at a fixed linear velocity, or to a ZCAV (Zone Constant Angular Velocity) type disk, which is rotated at a fixed angular frequency for each concentric regions in the disk.

Figure 2:
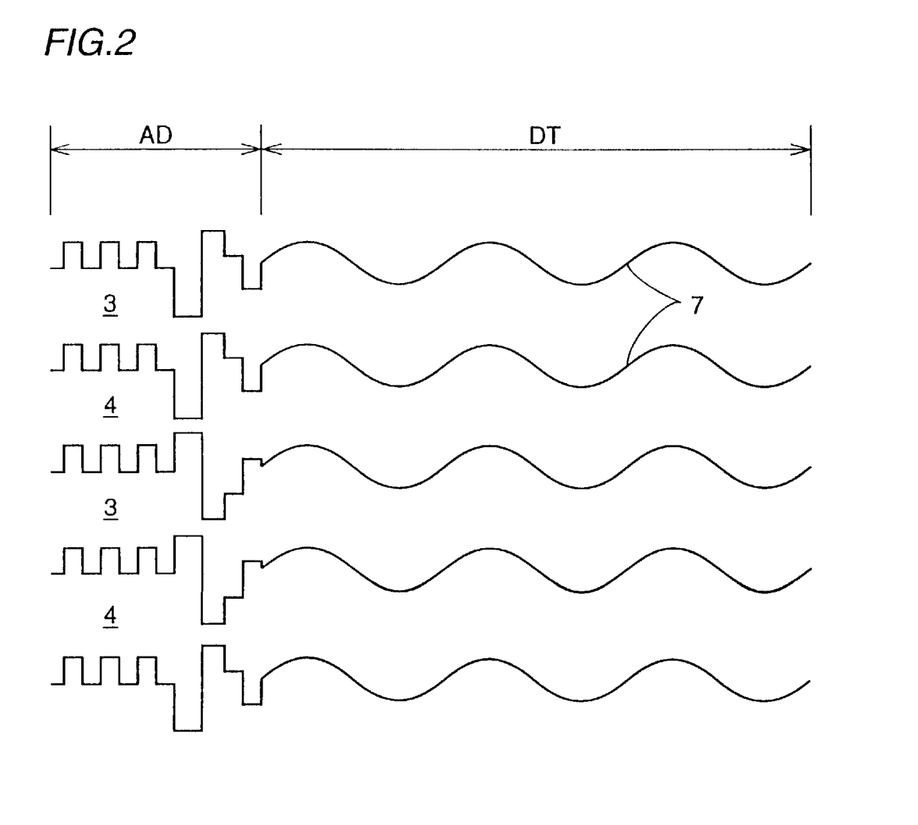
FIG. 2 is a plan view showing the track structure of the magneto-optical disk shown in FIG. 1.

The widths of groove 3 and land 4 are fixed. As shown in FIG. 2, both sidewalls 7 of groove 3 wobble at a fixed amplitude and at a fixed cycle. The track formed by groove 3 and land 4 are separated into an address recording band AD and a data recording band DT. These bands correspond to an address portion and a data portion in a data format described below.

Both sidewalls 7 of groove 3 in address recording band AD wobble at a cycle shorter than that in data recording band DT. An address is previously recorded on magneto-optical disk 1 by physically wobbling groove 3 in address recording band AD. Therefore, the address may be read out by discriminating a high frequency component in a tracking signal included in a reflected laser beam. Data is recorded in data recording band DT according to a well-known magneto-optical recording method.

Figure 3:
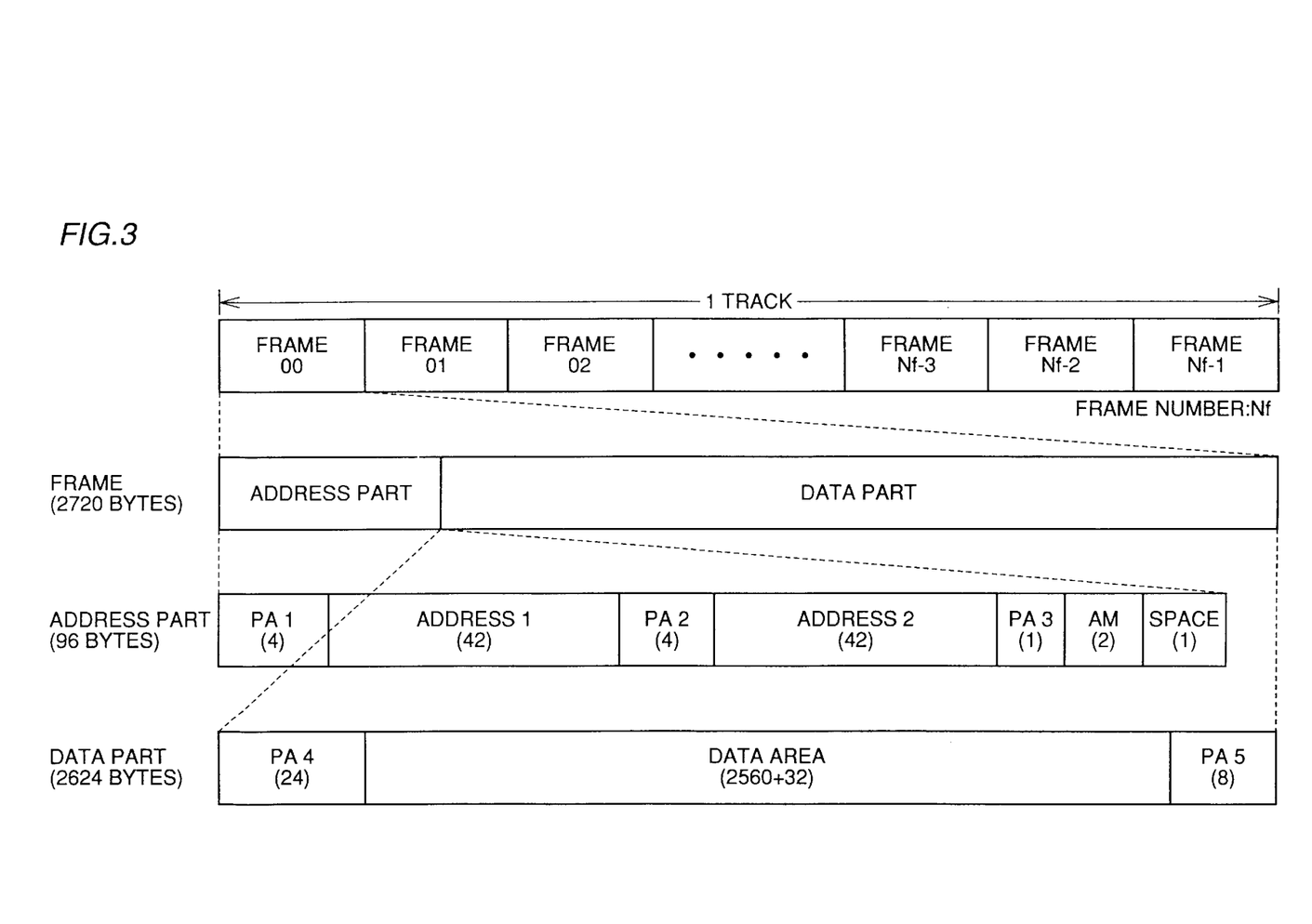
FIG. 3 is the data format of the magneto-optical disk shown in FIG. 1.

FIG. 3 shows the data format of magneto-optical disk 1. A frame, the minimum recording unit is divided into an address portion and a data portion. As described above, the address portion is recorded in address recording band AD on the track shown in FIG. 2, and the data portion is recorded in data recording band DT. Herein, the address is previously physically fixed on magneto-optical disk 1.

The address portion is separated into introductory areas PA1, PA2 and PA3, a first address, a second address, an address mark AM and a space. The data portion is separated into introductory areas PA4 and PA5 and a data area. Note that parenthesized numbers in FIG. 3 each indicate the byte number of a portion thereabove. More specifically, 1 frame is formed of the sum of the 96 bytes of the address portion and the 2624 bytes of the data portion, in other words formed of 2720 bytes.

Although not shown, the data area is formed of user data and data for controlling the dc current component of a recording signal. The data for controlling the dc component is prepared on the basis of 1-bit per 80 bits of user data. Therefore, a data area of 2592 bytes is formed of user data of 2560 bytes and data for controlling dc component of 32 bytes. Since the user data requires about 500 bytes for error correction, and the user data will be 2048 (2K) byte-data.

Introductory areas PA1 to PA5 are each a part for generating a clock signal to read a succeeding address or data. The first and second addresses are parts to record addresses corresponding to groove 3 and land 4. Address mark A is a part to specify whether to select the first address or second address. The space is a spare part allowed for waiting for a succeeding data portion.

If, for example, one cycle of wobble is 16 bytes (128 bits), and the bit density is 0.22 $\mu$m/bit, the track length per unit wobble (16 bytes) is 28.16 (=128×0.22) $\mu$m. At this bit density, the track length per 1 frame (2720 bytes) is 4.7872 (=2720÷16×28.16÷1000) mm, and therefore 164 (=2624÷16) wobbles are present in the data portion (2624 bytes) in one frame. If the diameter of magneto-optical disk 1 is set identical to the diameter of a compact disk (120 mm), per one round along the track, 30 frames are allocated at the inner part and about 74 ($\approx$120$\pi$÷4.7872) frames are allocated at the outer part.

When magneto-optical disk 1 rotates at a fixed angular velocity, the frequency of a synchronizing clock signal for recording/reproducing should be changed between the inner part and outer part in order to record/reproduce data at a fixed bit rate. More specifically, the frequency of the synchronizing clock signal should be higher at the outer part than at the inner part. If magneto-optical disk 1 rotates at, for example, 1800 rpm, the wobble frequency should be 377.4 (=1800÷60×74×2720÷16÷1000) KHz at the outer part where 74 frames are present. The synchronizing clock signal for recording/reproducing data is generated by a PLL (Phase Locked Loop) circuit using the frequency as will be described.

In order to record 32K-byte user data in the data format shown in FIG. 3 as is the case with a disk for video, for example, the user data per 1 frame is 2K byte (2028 bit) data as described above, one piece of video user data may be formed of 16 (=32÷2) frames on a simple calculation. However, with such a long data length, burst errors are less likely, data necessary for error correction may be reduced to reduce the redundancy. As a result, 32K-byte data may be formed of 15 frames.

If the 32K byte-data is formed of 15 frames, user data in 1 frame is 2560-byte data as described above, 38400(=2560×15)-byte user data will be necessary. In order to form the 38400-user data by 12 frames without changing the data format shown in FIG. 3, the recording. density in the data area should be 1.25 (=15÷12) times as high. The data area has 2592 (=2560+32) bytes as described above. Since the ratio of the user data and the data for controlling dc component is fixed in this data area, increasing the size of user data which can be recorded increases the size of data for controlling dc component in the same ratio. Therefore, if the recording density in the data area is uniformly set 1.25 times as high, the 38400-byte user data may be formed by 12 frames. In order to eliminate overs and shorts of data to be allocated to the data portions, the recording density in introductory areas PA4 and PA5 placed before and after the data area are also set 1.25 times as large. Stated differently, the recording density of the entire data portion is set 1.25 times as large. This recording density will be hereinafter referred to as "15 frame arrangement".

Similarly, in order to form 38400-byte user data by 12 frames, 10 frames, 6 frames, 5 frames, 4 frames, 3 frames and 1 frame, the recording density of the entire data portion may be set 1.25 (=15÷12) times, 1.5 (=15÷10) times, 2.5 (=15÷6) times, 3 (=15÷5) times, 3.75 (=15÷4) times, 5 (=15÷3) times and 15 (=15÷1) times as high, respectively. These recording densities will be hereinafter referred to as "12 frame arrangement", "10 frame arrangement", "6 frame arrangement", "5 frame arrangement", "4 frame arrangement", "3 frame arrangement" and "1 frame arrangement". In any of the arrangements, the data format shown in FIG. 3 as well as address recording band AD and data recording band DT is not changed. The physical size of 1 frame on the track is not changed either. In addition, in these arrangements, since the 38400-byte user data is equally allocated for the frames, a circuit for allocating the data may be implemented in a simple structure. Simply stated, the recording density of the entire data portion needs only be multiplied by a prescribed value.

The recording density may be improved on the data format as described above, while the recording/reproducing apparatus should be provided with recording/reproducing conditions necessary for recording a signal at the recording densities for actually implementing the improvement. The recording/reproducing condition could include various factors such as the wavelength of a laser beam. It is therefore necessary to determine at which recording density a signal may be recorded within the recording/reproducing condition inherent to the recording/reproducing apparatus.

Magneto-optical disk 1 according to this embodiment includes a table indicating the correlation between recording densities and recording/reproducing conditions in order to enable the above determination by the recording apparatus. Herein, a table indicating the correlation between recording densities and recording/reproducing conditions necessary for recording or reproducing a signal at the recording densities is previously stored in the TOC (Table Of Contents) region which is commonly provided in a magneto-optical disk. Note that the correlation information indicating the correlation may be indicated by other means than the table.

Figure 4:
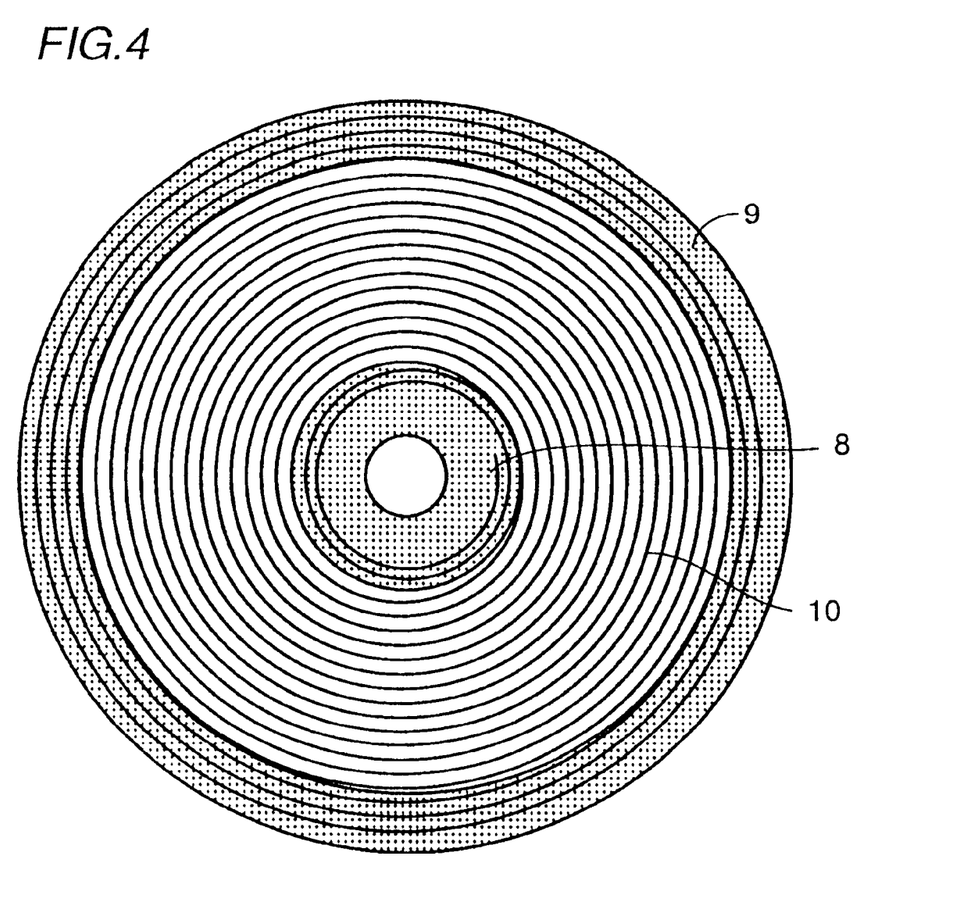
FIG. 4 is a plan view of the magneto-optical disk shown in FIG. 1.

As shown in FIG. 4, TOC regions 8 and 9 for recording contents data are provided at the inner and outer parts of the spiral track on magneto-optical disk 1. One hundred tracks are provided in each of inner TOC region 8 and outer TOC region 9. Between these TOC regions 8 and 9, a program region 10 is provided. These TOC regions 8 and 9 and program region 10 form recording area 6 shown in FIG.

Since TOC regions 8 and 9 are provided at the inner and outer parts of the spiral track, the TOC is always read at first if the recording/reproducing apparatus starts recording or reproducing from the inner part or outer part of the track. The invention is, however, not limited to this, and the TOC region needs only be provided at least one of the inner or outer parts of the spiral track.

The TOC may be recorded by forming bits like a compact disk, but in this embodiment, the TOC is formed by wobbling grooves 3 similarly to the above addresses.

Figure 5:
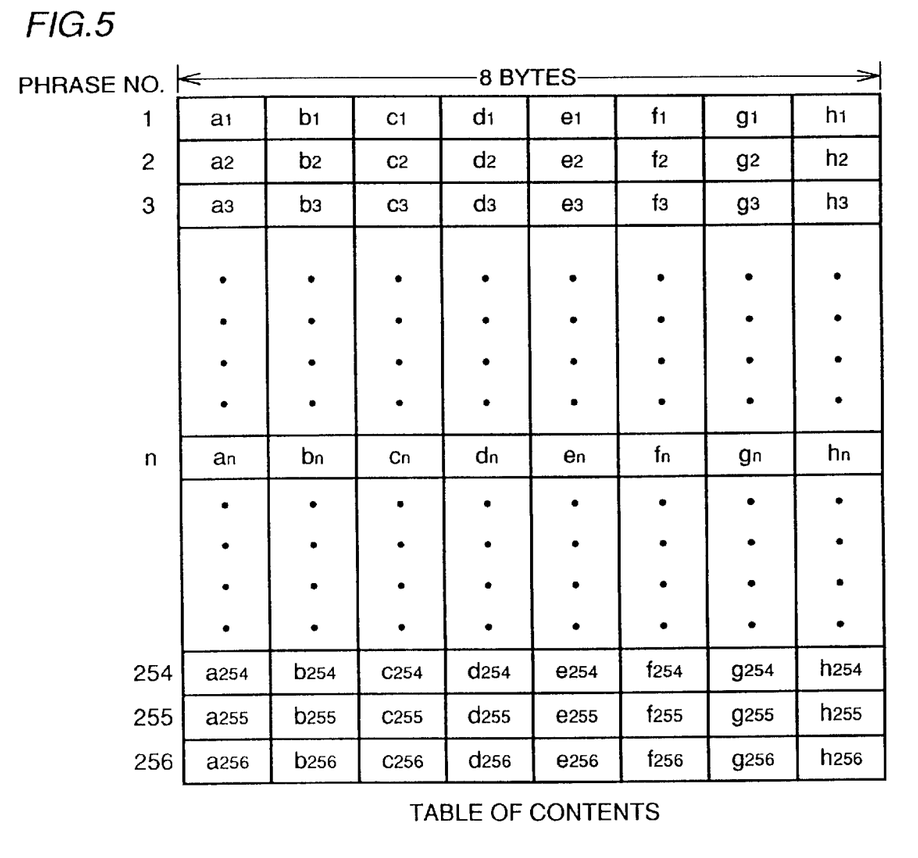
FIG. 5 shows the data arrangement of a TOC (Table of Contents) in the magneto-optical disk shown in FIG. 1.

FIG. 5 shows the data format of the TOC. As shown in FIG. 5, the TOC has 2K-byte (=8 byte×256) data. The data is repeatedly recorded in the TOC regions 8 and 9 shown in FIG. 4. The TOC generally has information including laser power at the time of recording/reproducing, the rotation velocity of the disk and an address at the start or end of the track. In addition to these kinds of information, the TOC according to this embodiment has a table indicating the correlation between recording densities and recording/reproducing conditions necessary for the recording/reproducing apparatus to record or reproduce a signal at the recording densities.

Herein, the recording/reproducing conditions refer to factors on the side of the recording/reproducing apparatus which contribute to determination of a recording density. For example, the smaller the converging spot of a laser beam for recording or producing, the more the recording density improves, and the size of the converging spot changes as the wavelength of the laser changes. Therefore, the wavelength of a semiconductor laser is one of the above-described factors. Other factors include the numerical aperture of an objective lens used, the recording method (for example, whether a so-called optical pulse magnetic field modulation recording method is employed), the kind of a pickup (for example, whether an optical super resolution pickup is employed), the reproducing method (for example, whether a so-called optical pulse reproducing method is employed), the signal processing method (for example whether PRML: Partial Response Maximum Likelihood is employed)and the like. Note that new techniques which will be developed in the future may be added to these factors.

Figure 6:
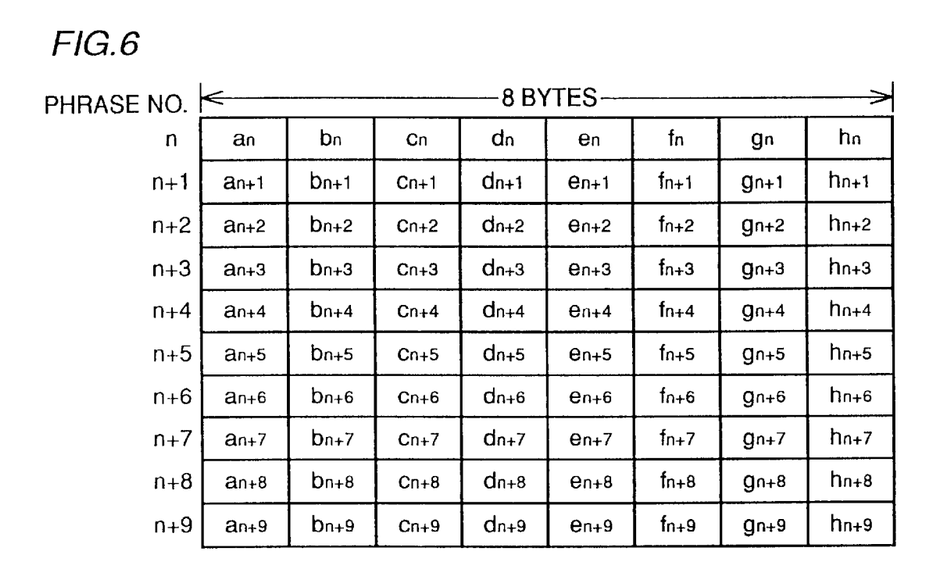
FIG. 6 is a table showing correlation between recording densities recorded in phrases No. n to (n+9) in FIG. 5 and recording/reproducing conditions.

The table showing the correlation between recording densities and recording/reproducing conditions correspond to phrases Nos. n to (n+9) in the TOC shown in FIG. 6. The table indicating the correlation therefore has 80-byte (=8 byte×10) data. Data an, bn, cn, dn, en, fn, gn, and hn in phrase No. n of the table indicate recording densities possible for this magneto-optical disk 1, more specifically the number of frames forming the 32K-byte video user data as described above. Data an indicates that the 32K-byte video user data is formed of 15 frames. This indicates the lowest recording density, in other words, the 15 frame arrangement, and the other data bn, cn, dn, en, fn, gn and hn correspond to the 12 frame arrangement, 10 frame arrangement, 6 frame arrangement, 5 frame arrangement, 4 frame arrangement, 3 frame arrangement and 1 frame arrangement, respectively. In the 1 frame arrangement, the 32K-byte video user data is formed of one frame, and therefore the highest recording density is achieved. Note that each of data an to hn is 1-byte data.

Data an+1, bn+1, cn+1, dn+1, en+1, fn+1, gn+1 and hn+1 in phrase No. (n+1) correspond to data an, bn, cn, dn, en, fn, gn and hn indicating the above-described frame arrangements, and each indicate a recording/reproducing condition necessary for implementing a corresponding frame arrangement. Data an+1 indicates a recording/reproducing condition necessary for implementing the 15 frame arrangement which is a standard recording density. Data bn+1 to hn+1 indicate recording/reproducing conditions necessary to be changed from those of the 15 frame arrangement.

Figure 7:
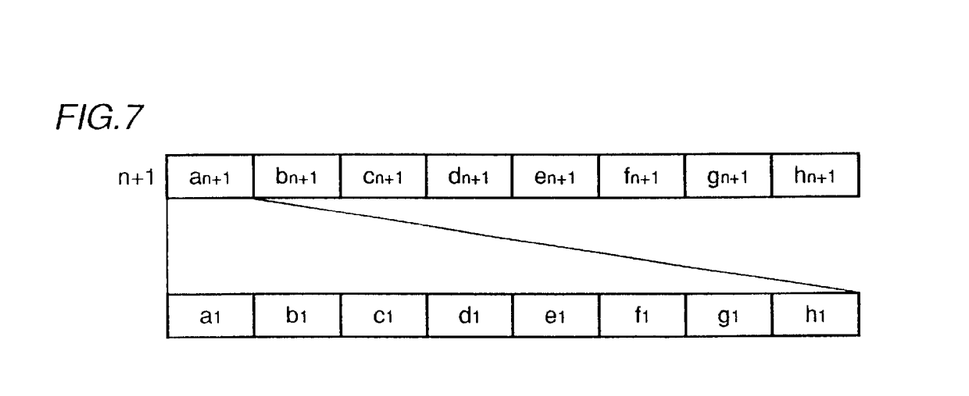
FIG. 7 shows phrase No. (n+1) shown in FIG. 6 and the bit arrangement of the phrase.

Data an+1 to hn+1 are each formed of 8 bits (1 byte) a1 to h1 as shown in FIG. 7. Bits a1, b1, c1, d1, e1 and f1 represent the wavelength of a semiconductor laser, the numerical aperture of an objective lens, the optical pulse magnetic field modulation recording, the optical super resolution pickup, the optical pulse reproducing method and the PRML signal processing method, respectively. Bits g1 and h1 are reserved. Data an+1 represents the recording/reproducing conditions of the 15 frame arrangement at the standard density, and therefore the 8 bits (a1, b1, c1, d1, e1, f1, g1 and h1) of data an+1 is "00000000". If, for example, the 8 bits of data bn+1 indicating recording/reproducing conditions necessary for the recording density of the 12 frame arrangement is "10100000", the wavelength of the semiconductor laser should be changed and the optical pulse magnetic field modulation recording method should be employed in order to change the 15 frame arrangement to the 12 frame arrangement.

Phrases No. (n+2) to (n+9) are allocated to data an+1 to hn+1, respectively. Phrase No. (n+2) corresponds to data an+1 indicating recording/reproducing conditions necessary for the standard recording density for the 15 frame arrangement, and specific parameters for the recording/reproducing conditions. Data an+2, bn+2, cn+2, dn+2, en+2, and fn+2 indicate the wavelength of the semiconductor laser, the numerical aperture of the objective lens, the parameters of the optical pulse magnetic field modulation recording method, the parameters of the optical super resolution pickup, the parameters of the optical pulse reproducing method, and the parameters of the PRML signal processing method. Similarly, phrase No. (n+2) corresponds to data bn+1 indicating recording/reproducing conditions necessary for the recording density of the 12 frame arrangement, and specific parameters for the recording/reproducing conditions, phrase No. (n+4) corresponds to data cn+1 indicating recording/reproducing conditions necessary for the recording density of the 10 frame arrangement and specific parameters for the recording/reproducing conditions. Other phrases No. (n+5) to (n+9) indicate specific parameters for recording/reproducing conditions.

If, for example, a semiconductor laser having a wavelength of 650 nm is necessary to record or reproduce a signal to or from magneto-optical disk 1 at the recording density of the 15 frame arrangement, the 8 bits of data an+1 is "10000000". The first bit "1" indicates the wavelength of 650 nm. If a semiconductor laser having a wavelength of 635 nm is necessary to record or reproduce a signal to or from magneto-optical disk 1 at the recording density of the 12 frame arrangement, the 8 bits of data an+3 is "01000000". The second bit "1" indicates the wavelength of 635 nm.

In this embodiment, the first bits of data an+2 to an+8 correspond to prescribed wavelengths such as 650 nm and 635 nm. However, in place of the method indicating a wavelength using a bit position, the 8 bits of data an+2, an+3, . . . , or an+9 may indicate the numerical value of a specific wavelength.

In the table set forth in FIG. 6, data an+1 to hn+1 in phrase No. (n+1) each indicate only a single recording/reproducing condition necessary for a corresponding frame arrangement, but there are a plurality of combinations of recording/reproducing conditions to be changed depending upon the frame arrangement. The number of the combinations may increase in association with development of new techniques, and more than one table might be necessary. On the other hand, the TOC has a capacity of 2K bytes as described above, and 100 tracks are allocated to TOC regions 8 and 9, and therefore tables may be added as necessary if the number of the combinations increases as new technology is introduced.

While the table has a plurality of recording densities and a plurality of recording/reproducing conditions corresponding to these densities, the table may have only a standard recording density (the 15 frame arrangement in the above example) and a recording/reproducing condition corresponding to the density. If such a table is recorded in magnet-optical disk 1, the recording/reproducing apparatus is adapted to calculate a recording density possible under the recording/reproducing condition for the standard recording density. In place of including a plurality of recording densities into one table as described above, a table may be prepared for each recording density.

Figure 8:
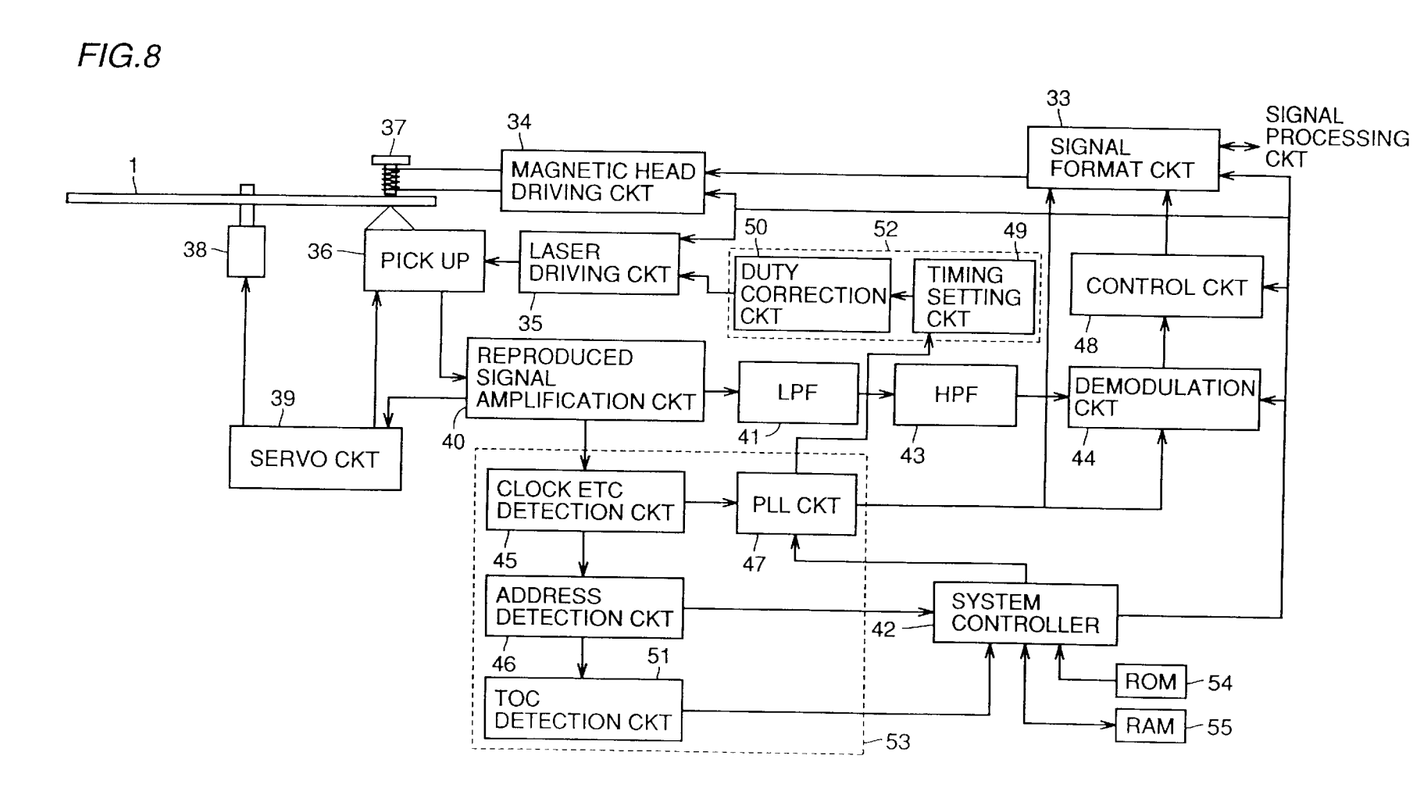
FIG. 8 is a block diagram showing the configuration of a recording/reproducing apparatus for the magneto-optical disk shown in FIG. 1.

FIG. 8 is a block diagram showing the configuration of a recording/reproducing apparatus for recording and/or reproducing signals of magneto-optical disk 1. Referring to FIG. 8, the recording/reproducing apparatus includes a signal format circuit 33, a magnetic head driving circuit 34, a laser driving circuit 35, a pickup 36, a magnetic head 37, a spindle motor 38, a servo circuit 39, a reproduced signal amplification circuit 40, a low pass filter 41, a system controller 42, a high pass filter 43, a modulation circuit 44, a clock etc detection circuit 45, an address detection circuit 46, a PLL circuit 47, a control circuit 48, a timing setting circuit 49, a duty correction circuit 50, and a TOC detection circuit 51 in order to record/reproduce a signal to/from magneto-optical disk 1.

Recording data applied from a signal processing circuit (not shown) is formatted into a pulse string in signal format circuit 33, and applied to magnetic head driving circuit 34. Meanwhile, a laser driving signal is applied to pick up 36 from laser driving circuit 35, and a laser beam having a prescribed recording power is directed to a surface of magneto-optical disk 1 on the side opposite to magnetic head 37. Magnetic head driving circuit 34 drives magnetic head 37 in response to the pulse string signal from signal format circuit 33, and magnetic head 37 records a prescribed signal on the track of magnet-optical disk 1.

A laser beam from pickup 36 is formed into a pulse in synchronization with a switching of magnetization by magnetic head 37. More specifically, the recording/reproducing apparatus employs the optical pulse magnetic field modulation recording method. The laser beam is radiated when the magnetic field from magnetic head 37 reaches a prescribed level. This control is made by a pulsing control circuit 52 formed by timing setting circuit 49 and duty correction circuit 50.

More specifically, timing setting circuit 49 adjusts the timing of magnetization and the timing of laser irradiation. Duty correction circuit 50 sets the duty ratio (irradiation time) of the pulsed laser beam. When the duty ratio is small, in other words the irradiation time is short, a small recording spot is obtained, even if magnetic head 37 takes a long period of time for switching magnetization. Meanwhile, the small duty ratio requires a large laser power. An optimum duty ratio is set based on the maximum output of the laser and the switching time period of magnetic head 37. The synchronization of the timing of magnetization and the timing of laser irradiation are adjusted in response to a synchronizing clock signal from PLL circuit 47.

A laser beam from pickup 36 is irradiated upon magneto-optical disk 1 on the side of transparent substrate 2. Pickup 36 detects the laser beam reflected from magneto-optical disk 1, and produces a main signal, a tracking error signal and a focus error signal for application to reproduced signal amplification circuit 40. The main signal is applied to modulation circuit 44 through low pass filter 41 and high pass filter 43, modulated by modulation circuit 44 and applied to a signal processing circuit (not shown). Meanwhile, the tracking error signal and focus error signal are applied to servo circuit 39 to control the rotation of spindle motor 38 and the tracking and focusing of pickup 36. A well known push-pull method is employed for the tracking control.

The tracking error signal is also applied to control signal detection circuit 53 formed by clock etc detection circuit 45, address detection circuit 46, PLL circuit 47 and TOC detection circuit 51, in order to detect a synchronizing clock signal and other signals. The tracking error signal is applied to clock etc detection circuit 45 which discriminates the frequency of the signal. More specifically, the component of a tracking error signal in the frequency band of a wobble in the track is applied to PLL circuit 47. The component in the frequency band of an address signal is applied to address detection circuit 46 and TOC detection circuit 51, demodulated by these circuits 46 and 51, and then applied to system controller 42.

PLL circuit 47 produces a synchronizing clock signal for recording/reproducing, and applies the signal to signal format circuit 33, demodulation circuit 44 and timing setting circuit 49. If, for example, the outermost rack part of magneto-optical disk is formed by 74 frames and magneto-optical disk 1 rotates at 1800 rpm, the wobble frequency is 377.4 KHz. In order to form the 32K-byte video user data described above by 15 frames, a recording/reproducing synchronizing clock signal at 48.3072 MHz is necessary. Therefore, the ratio of a frequency divider (which will be described) in PLL circuit 47 should be set to 1/128 (=377.4 KHz/48.3072 MHz). The ratio should be 1/162 for the 12 frame arrangement and 1/192 for the 10 frame arrangement.

In this embodiment, the ratio of the frequency divider in PLL circuit 47 should be changeable as required in response to an instruction from system controller 42. More specifically, system controller 42 determines a recording density which can be achieved by the recording/reproducing apparatus based on the above table applied from TOC detection circuit 51. At the time of recording, the dividing ratio of PLL circuit 47 is set such that the recording/reproducing apparatus may record at the highest recording density. At the time of reproduction, the ratio of PLL circuit 47 is set such that the recording/reproducing apparatus may reproduce a signal at the above recording density at the time of recording.

The recording/reproducing apparatus further includes a ROM (Read Only Memory) 54 which stores data related to a plurality of possible recording/reproducing conditions, and a RAM (Random Access Memory) 55 which writes and reads detected TOC. System controller 42 includes a microprocessor which accesses these ROM 54 and RAM 55 according to programs (FIGS. 10 and 11) which will be described.

Figure 9A:
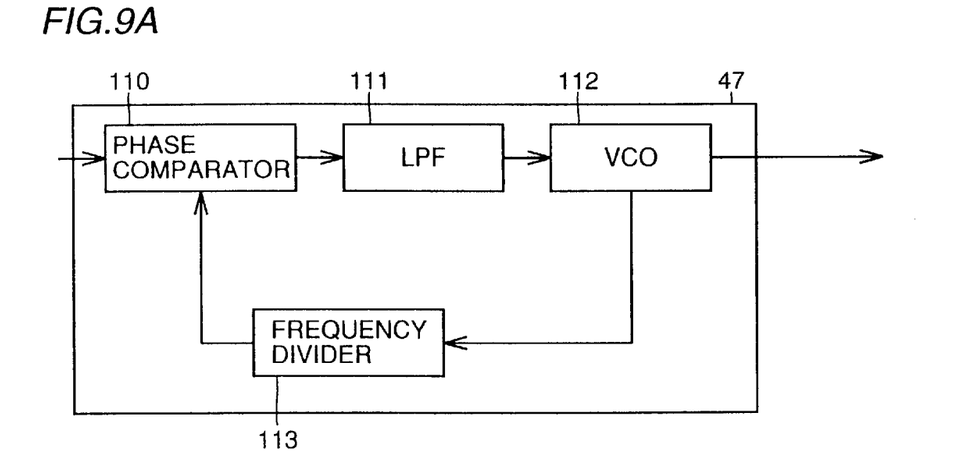
FIG. 9A is a block diagram showing the configuration of the PLL circuit shown in FIG. 8.
Figure 9B:
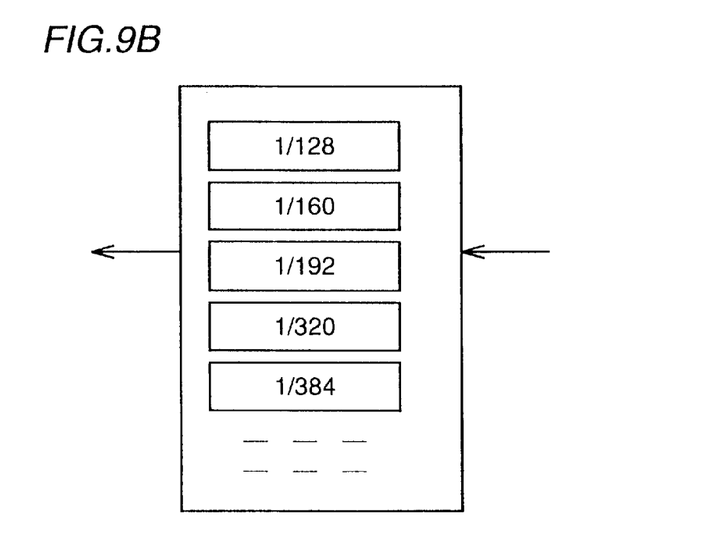
FIG. 9B shows dividing ratios which can be set for the frequency divider shown in FIG. 9A.

FIG. 9A is a block diagram showing the specific configuration of PLL circuit 47. Referring to FIG. 9A, PLL circuit 47 includes a phase comparator 110, a low pass filter (LPF) 111, a voltage control oscillator (VCO) 112 and a frequency divider 113. The tracking error signal from clock etc detection circuit 45 shown in FIG. 8 is compared in phase in phase comparator 110 with a synchronizing clock signal output from VCO 112. An output signal representing the result of the comparison is applied to VCO 112 through low pass filter 111. Voltage applied from low pass filter 111 changes depending upon the phase difference between the tracking error signal and the synchronizing clock signal. The synchronizing clock signal from VCO 112 is frequency-divided by frequency divider 113 and the frequency-divided signal is applied to phase comparator 110. As shown in FIG. 9B, the ratio of frequency divider 113 may be switched among a plurality of fractions, one of which is selected in response to an instruction from system controller 42. By switching the dividing ratio, a synchronizing clock signal at a frequency depending upon a recording density may be produced.

The recording operation of the recording/reproducing apparatus onto magneto-optical disk 1 will be now described.

The recording/reproducing apparatus previously stores parameters of various recording/reproducing conditions corresponding to various recording densities such that the recording/reproducing apparatus may record data at the various recording densities. If several wavelengths may be selected for the semiconductor laser, parameters corresponding to these several wavelengths are also stored in ROM 54. If several numerical apertures may be selected for the objective lens, parameters corresponding to those numerical apertures are stored. Since the above-recording/reproducing apparatus employs the optical pulse magnetic field modulation recording method, parameters corresponding to the method are also stored. System controller 42 shown in FIG. 8 can access ROM 54 and read out these parameters.

Figure 10:
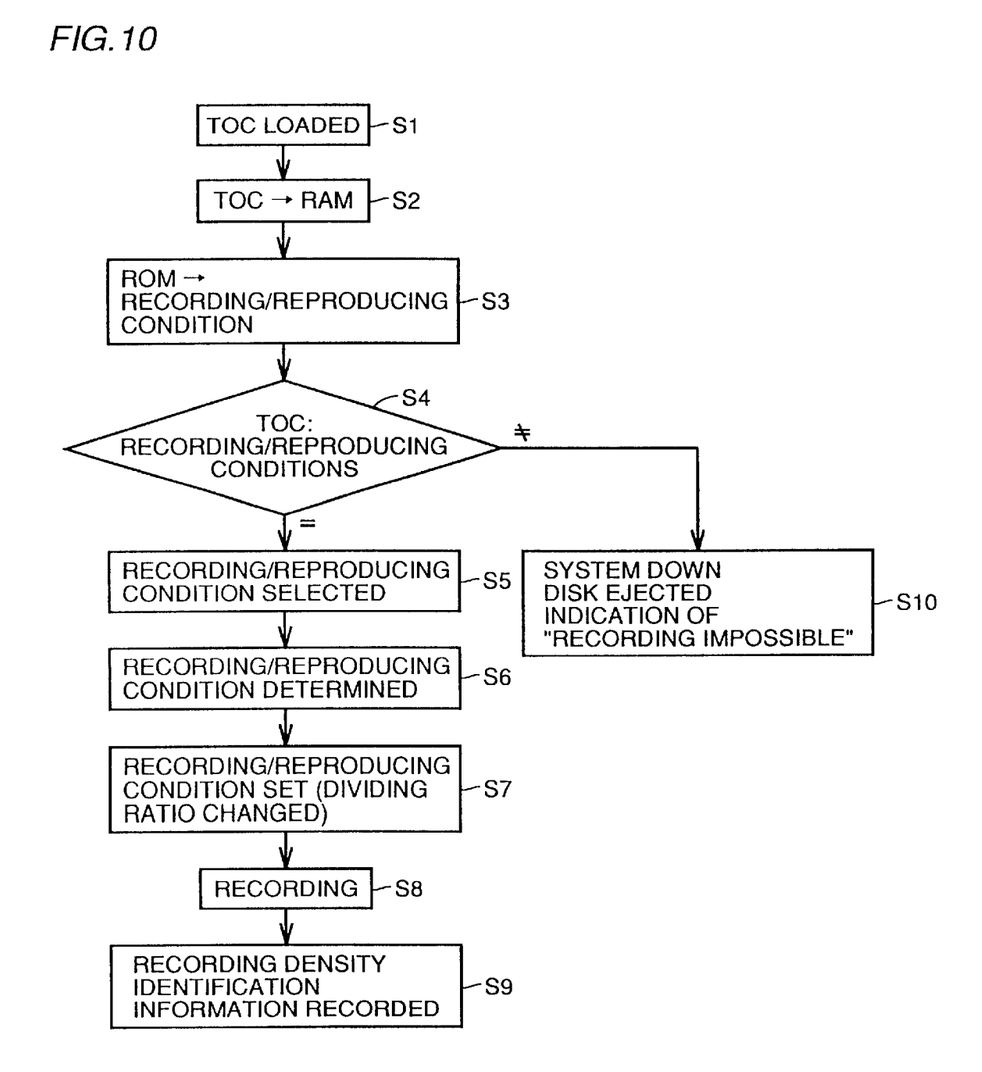
FIG. 10 is a flow chart for use in illustration of a recording operation by the recording/reproducing apparatus shown in FIG. 8.

When a signal is recorded onto magneto-optical disk 1, a TOC is loaded from disk 1 in step S1 as shown in FIG. 10. Then in step S2, the loaded TOC is written into RAM 55. In step S3, parameters of recording/reproducing conditions which can be selected by the recording/reproducing apparatus are read out from ROM 54.

Then in step S4, the table of TOC (FIG. 6) written in RAM 55 is compared to the parameters read out from ROM 54. More specifically, the parameters of a plurality of recording/reproducing conditions included in the table are compared to the parameters read out from ROM 54. As a result of comparison, it is determined which recording density among the plurality of recording densities included in the table may be achieved by the recording/reproducing apparatus, and only the recording densities which can be achieved are selected in step S5. More specifically, from the parameters of the plurality of recording/reproducing conditions included in the table, the recording/reproducing conditions of parameters in confidence with the parameters read out from ROM 54 are selected, and the recording densities corresponding to the selected recording/reproducing conditions are selected. As a result, only the recording densities which can be achieved by the recording/reproducing apparatus are selected from the table.

Among thus selected plurality of recording densities, the highest recording density is determined in step S6. Based on the determined recording density, the parameters of a recording/reproducing condition for the recording/reproducing apparatus are set in step S7. More specifically, one of the plurality of wavelengths of the semiconductor laser is selected, or one of the plurality of numerical apertures of the objective lens is selected. The optical pulse magnetic field modulation recording method is employed or not employed. The dividing ratio of frequency divider 113 in PLL circuit 47 is set depending upon the selected recording density. The ratio is set to 1/128 for the 15 frame arrangement, and to 1/160 for the 12 frame arrangement. The frequency of the synchronizing clock signal generated by PLL circuit 47 is changed accordingly. Herein, if a plurality of parameters are present or the parameters may linearly change, optimum parameters are set.

Once the recording density is determined and a recording/reproducing condition depending upon the recording density is set for the recording/reproducing apparatus as described above, the recording/reproducing apparatus records a signal to magneto-optical disk 1 at the determined recording density in step S8. The recording method is the same as the conventional method other than that the size of data to be recorded is changed depending upon the recording density. More specifically, when system controller 42 receives an address mark detection signal from address detector 48, data for 1 frame in the data portion is applied to magnetic head driving circuit 34 from signal format circuit 33 in response to a synchronizing clock signal, in response to which the signal is recorded. In the 15 frame arrangement as described above, the size of the data portion in 1 frame is 2624 bytes, and therefore in the 12 frame arrangement, the size of the data portion in 1 frame is 3280 bytes (=2624 bytes×1.25).

After the signal is recorded onto magneto-optical disk 1 at thus determined recording density, recording density identification information to identify the recording density at which the signal has been recorded is recorded on magneto-optical disk 1 in step S9. If for example, the signal has been recorded at the recording density of the 15 frame arrangement, data representing the 15 frame arrangement is recorded. If the signal has been recorded at the recording density of the 12 frame arrangement, data representing the 12 frame arrangement is recorded. A magneto-optical disk usually has a UTOC (UTOC; User Table of Contents) region for recording contents information on recorded information between the TOC region and program region, and therefore the recording density identification information is desirably recorded in the UTOC region. If a disk has different recording densities between concentric zones formed thereon, the recording density identification information may be recorded together with the starting address of each zone.

Meanwhile, if none of recording/reproducing conditions in the table included in the TOC is in coincidence with recording/reproducing conditions which can be set in the recording/reproducing apparatus in step S4, more specifically, no recording density in the table may be employed for the recording/reproducing apparatus, system controller 42 determines that a signal cannot be recorded onto magneto-optical disk 1, turns down the system in step S10, ejects magneto-optical disk 1, and makes an indication of "recording impossible" or making an alarm.

In step S6, the highest recording density among the selected plurality of recording densities is automatically determined, but alternatively a user may select a desired recording density from these recording densities. In such a case, an additional step is provided between steps S5 and S6 in FIG. 10 to indicate the plurality of recording densities selected in step S5 on a display (not shown), and a recording density may be specified in response to a user's specification from the plurality of recording densities thus displayed in step S6 following the step. Thus selected recording densities may be directly displayed, the remaining recordable time period may be desirably displayed for user's convenience. After a desired recording density is selected in response to the user's specification, a recording/reproducing condition necessary for the selected recording density is set in the recording/reproducing apparatus in step S7 similarly to the above case.

Note that if only one recording density may be employed for the recording/reproducing apparatus, only the recording density is displayed on the display. In this case, the user does not to have select a recording density. If none of recording densities recorded on magneto-optical disk 1 may be employed by the recording/reproducing apparatus, no recording density is displayed, and a processing such as system down similarly to the above case is conducted.

Figure 11:
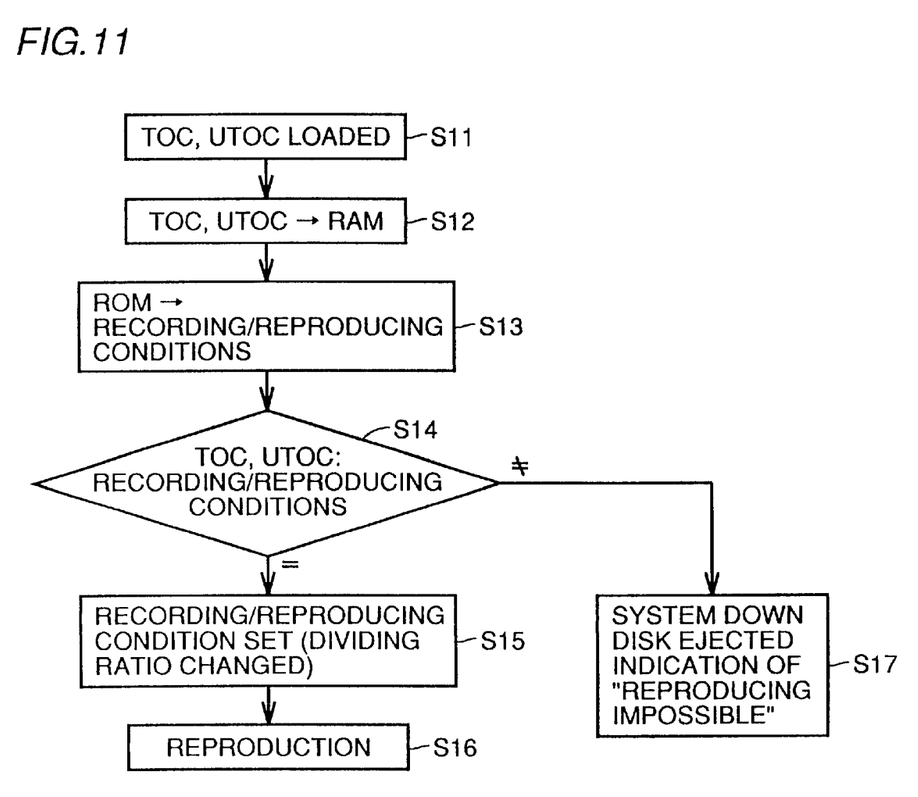
FIG. 11 is a flow chart for use in illustration of a reproducing operation by the recording/reproducing apparatus shown in FIG. 8.

The operation of the recording/reproducing apparatus as shown in FIG. 8 to reproduce data from magneto-optical disk 1 will be now described.

In step S11, the TOC and UTOC are loaded from magneto-optical disk 1, and the loaded TOC and UTOC are written into RAM 55 in step S12. In step S14, recording/reproducing conditions which can be set in the recording/reproducing apparatus are read out from ROM 54.

Then, in step S14, the TOC and UTOC written in RAM 55 are compared to the parameters of the recording/reproducing conditions read out from ROM 54. More specifically, based on recording density identification information included in the UTOC, recording/reproducing conditions necessary for reproducing a signal at the recording densities are read out from the table included in the TOC, and it is determined if the recording/reproducing conditions are in coincidence with any of recording/reproducing conditions which can be set in the recording/reproducing apparatus.

If there is a coincidence, in other words, if reproducing is possible, a recording/reproducing condition necessary to reproduce a signal at the recording density is set in the recording/reproducing apparatus in step S15. More specifically, the wavelength of the semiconductor laser is set to a prescribed value, the numerical aperture of the objective lens is set to a prescribed value and so on. The dividing ratio of frequency divider 113 in PLL circuit 47 shown in FIG. 9A is changed depending upon the recording density, and the frequency of the synchronizing clock signal is changed accordingly.

In step S16, the recording/reproducing apparatus reproduces a signal from magneto-optical disk 1 at the above identified recording density. If the recording/reproducing apparatus includes for example, an optical super resolution pickup, the beam from the semiconductor laser is partially interrupted to produce small size converging spots. If liquid crystal is used to partially interrupt the laser beam, the beam spots may have two sizes by applying or not applying voltage to the liquid crystal. Therefore, the size of converging spots may be switched as desired depending upon the recording density at which a signal has been recorded onto magneto-optical disk 1.

Meanwhile, if the recording/reproducing condition selected based on the recording density identification information is not in coincidence with the recording/reproducing conditions which can be set in the recording/reproducing apparatus in step S14, in other words, if the recording/reproducing apparatus cannot reproduce a signal at the identified recording density, system controller 42 turns down the system, ejects disk 1, makes an indication of "reproducing impossible" or making an alarm to notify the user thereof.

As in the foregoing, according to the embodiment of the invention, a table having recording densities and recording/reproducing conditions necessary for recording/reproducing a signal at the recording densities are recorded in magneto-optical disk 1, the recording/reproducing apparatus can record a signal at the highest density or at a desired recording density among the recording densities which can be employed for the apparatus. If the recording techniques further advance, signals may be recorded in the same data format without having to change the specification of magneto-optical disk 1. As a result, a recording/reproducing apparatus may be readily improved in order to improve the recording density.

The 38400-byte user data is equally allocated to the frames, and therefore the circuit configuration for allocating the user data may be simplified. The above-described table is recorded in the TOC region 8 or 9 in the innermost or outermost track portion, and therefore is sure to be read out before recording or reproducing. Since recording density identification information to identify the recording density at which a signal has been recorded is recorded in magneto-optical disk 1, the recording/reproducing apparatus may reproduce the signal from magneto-optical disk 1 at the recording density.

As in the foregoing, one embodiment of the invention has been described, the invention is not limited to the above embodiment, and may be implemented in forms with various modifications. For example, a magneto-optical disk is described as an example of a storage medium in the above embodiment, the present invention is also applicable to a phase changing type magneto-optical disk, other rewritable, write-once or ROM disks, tapes, drums or the like which use an organic pigment-based material or a metal based material.

Furthermore, the track shape, data format and the like may be changed as desired. In the above-described embodiment, an address is recorded in address recording band AD placed before data recording band DT, but an address may be recorded by wobbling the track like a mini disk.

The specific numbers such as byte numbers described in the embodiment are simply by way of illustration. Although, in the above-embodiment, in order to equally allocate original data in the 15 frame arrangement to the frames, the recording density is set corresponding to the 12 frame arrangement, 10 frame arrangement, 6 frame arrangement, 5 frame arrangement, 4 frame arrangement, 3 frame arrangement or 1 frame arrangement, any frame arrangement such as a 9 frame arrangement in which the 38400-byte original data cannot be equally allocated may be employed. In such a case, dummy data may be added to the final eighth frame to be compatible with the data amounts of the other frames.

The recording/reproducing conditions of the recording/reproducing apparatus are not limited to those described in the above-embodiment, in addition to other recording/reproducing conditions which are known at this point, recording/reproducing conditions which will be required in association with new developments in the technology may be employed as desired.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A storage medium, comprising:
   a recording area;
   correlation information recorded in said recording area for indicating correlation between a recording density and a recording and/or reproducing condition necessary for a recording and/or reproducing apparatus to record and/or reproduce a signal at the recording density,
   wherein said correlation information includes a table having:
      a plurality of recording densities, and
      a plurality of recording and/or reproducing conditions each necessary for said recording and/or reproducing apparatus to record and/or reproduce a signal at a corresponding recording density.

2. The storage medium as recited in claim 1, wherein said recording area has a magneto-optical recording film.

3. The storage medium as recited in claim 1, wherein said recording and/or reproducing condition includes the wavelength of a laser in said recording and/or reproducing apparatus.

4. The storage medium as recited in claim 1, wherein said recording and/or reproducing condition includes a numerical aperture of an objective lens in said recording and/or reproducing apparatus.

5. The storage medium as recited in claim 1, wherein
said recording and/or reproducing condition includes a method of recording by said recording and/or reproducing apparatus.

6. The storage medium as recited in claim 1, wherein
said recording and/or reproducing condition includes a method of reproducing by said recording and/or reproducing apparatus.

7. The storage medium as recited in claim 1, wherein
said recording and/or reproducing condition includes a method of processing a signal by said recording and/or reproducing apparatus.

8. The storage medium as recited in claim 1, further comprising a plurality of recording unit regions for recording prescribed data,
said recording density permitting said prescribed data to be equally allocated to said plurality of recording unit regions.

9. The storage medium as recited in claim 1, wherein
said recording area has a spiral-formed track, and
said correlation information is recorded at the innermost and/or outermost part of said track.

10. The storage medium as recited in claim 1, further comprising identification information recorded in said recording area for identifying a recording density at which said signal has been recorded.

11. A method of recording a signal onto a storage medium including a recording area and correlation information recorded in said recording area for indicating a recording density and a recording condition necessary for a recording apparatus to record a signal at the recording density, comprising the steps of:
loading said correlation information from said storage medium;
determining said recording density based on said loaded correlation information; and
setting said recording condition to said recording apparatus based on said determined recording density,
wherein said correlation information includes a table having a plurality of recording densities and a plurality of recording and/or reproducing conditions each necessary for the recording and/or reproducing apparatus to record and/or reproduce a signal at a corresponding density.

12. A method of recording a signal onto a storage medium including a recording area and correlation information recorded in said recording area for indicating a recording density and a recording condition necessary for a recording apparatus to record a signal at the recording density, comprising the steps of:
loading said correlation information from said storage medium,
determining said recording density based on said loaded correlation information; and
setting said recording condition to said recording apparatus based on said determined recording density,
wherein said recording apparatus has a plurality of first recording conditions which are necessary for recording said signal and can be selectively set, said correlation information has a table having a plurality of recording densities, and a plurality of second recording conditions which correspond to said plurality of recording densities and are each necessary for recording said signal at a corresponding recording density,
said step of determining including the steps of:
comparing said plurality of first recording conditions to said plurality of second recording conditions in said loaded table;
selecting a second recording condition coinciding with said first recording condition among said plurality of second recording conditions in response to the result of said step of comparing; and
specifying a recording density corresponding to said selected second recording condition among said plurality of recording densities.

13. The method as recited in claim 12, further comprising the step of interrupting recording said signal if none of said second recording conditions is in coincidence with each of said first recording conditions based on the result of said step of comparing.

14. A method of recording a signal onto a storage medium including a recording area and correlation information recorded in said recording area for indicating a recording density and a recording condition necessary for a recording apparatus to record a signal at the recording density, comprising the steps of:
loading said correlation information from said storage medium;
determining said recording density based on said loaded correlation information; and
setting said recording condition to said recording apparatus based on said determined recording density,
wherein said recording apparatus has a plurality of first recording conditions which are necessary for recording said signal and can be selectively set, said correlation information has a table having a plurality of recording densities, and a plurality of second recording conditions which correspond to said plurality of recording densities and are each necessary for recording said signal at a corresponding recording density,
said step of determining including the steps of:
comparing said plurality of first recording conditions to said plurality of second recording conditions in said loaded table;
selecting a plurality of second recording conditions coinciding with said first recording conditions among said plurality of second recording conditions in response to the result of said step of comparing;
indicating a plurality of recording densities corresponding to said selected plurality of second recording conditions; and
specifying one of said indicated plurality of recording densities in response to an instruction by a user.

15. A method of recording a signal onto a storage medium including a recording area and correlation information recorded in said recording area for indicating a recording density and a recording condition necessary for a recording apparatus to record a signal at the recording density, comprising the steps of:
loading said correlation information from said storage medium;
determining said recording density based on said loaded correlation information; and
setting said recording condition to said recording apparatus based on said determined recording density,
wherein said step of setting includes the step of changing the frequency of a synchronizing clock signal used to record said signal in response to said determined recording density.

16. The method as recited in claim 15, wherein said recording apparatus includes a frequency divider for generating said synchronizing clock signal, and said step of changing changes the dividing ratio of said frequency divider in response to said determined recording density.

17. A method of recording a signal onto a storage medium including a recording area and correlation information recorded in said recording area for indicating a recording density and a recording condition necessary for a recording apparatus to record a signal at the recording density, comprising the steps of:

loading said correlation information from said storage medium;

determining said recording density based on said loaded correlation information; and setting said recording condition to said recording apparatus based on said determined recording density, wherein said storage medium further includes a plurality of recording unit regions for recording prescribed data, and said recording density permits said prescribed data to be equally allocated to said plurality of recording unit regions.

18. A method of reproducing a signal from a storage medium including a recording area, correlation information recorded in said recording area for indicating correlation between a recording density and a reproducing condition necessary for a reproducing apparatus to reproduce a signal at the recording density, and identification information recorded in said recording area for identifying a recording density at which said signal has been recorded, comprising the steps of:

loading said correlation information and said identification information from said storage medium; and setting said reproducing condition to said reproducing apparatus based on said loaded correlation information and identification information, wherein said correlation information includes a table having a plurality of recording densities and a plurality of recording and/or reproducing conditions each necessary for the recording and/or reproducing apparatus to record and/or reproduce a signal at a corresponding density.

19. A method of reproducing a signal from a storage medium including a recording area, correlation information recorded in ssid recording area for indicating correlation between a recording density and a reproducing condition necessary for a reproducing apparatus to reproduce a signal at the recording density, and identification information recorded in said recording area for identifying a recording density at which said signal has been recorded, comprising the steps of:

loading said correlation information and said identification information from said storage medium; and setting said reproducing condition to said reproducing apparatus based on said loaded correlation information and identification information, wherein said step of setting includes the step of changing the frequency of a synchronizing clock signal used to reproduce said signal in response to the recording density in said loaded identification information.

20. The method as recited in claim 19, wherein said reproducing apparatus includes a frequency divider for generating said synchronizing clock signal, and said step of changing changes the dividing ratio of said frequency divider in response to the recording density in said loaded identification information.

* * * * *